(12) United States Patent
Kerrom et al.

(10) Patent No.: US 7,934,431 B2
(45) Date of Patent: May 3, 2011

(54) MEASURING TRANSDUCER OF A FLOW MEASURING DEVICE APPLIED IN INDUSTRIAL MEASUREMENTS TECHNOLOGY

(75) Inventors: Roger Kerrom, Lörrach (DE); Antonio Magliocca, Basel (CH)

(73) Assignee: Endress + Hauser Flowtec AG, Reinach (CH)

( * ) Notice: Subject to any disclaimer, the term of this patent is extended or adjusted under 35 U.S.C. 154(b) by 146 days.

(21) Appl. No.: 12/224,419

(22) PCT Filed: Mar. 9, 2007

(86) PCT No.: PCT/EP2007/052207
§ 371 (c)(1),
(2), (4) Date: Jan. 26, 2009

(87) PCT Pub. No.: WO2007/104707
PCT Pub. Date: Sep. 20, 2007

(65) Prior Publication Data
US 2009/0223304 A1    Sep. 10, 2009

(30) Foreign Application Priority Data
Mar. 13, 2006   (DE) .......................... 10 2006 011 756

(51) Int. Cl.
    *G01F 1/58*    (2006.01)
(52) U.S. Cl. .................................... 73/861.11
(58) Field of Classification Search .................. None
    See application file for complete search history.

(56) References Cited

U.S. PATENT DOCUMENTS

| 2,766,621 | A |   | 10/1956 | Raynsford |           |
|-----------|---|---|---------|-----------|-----------|
| 4,351,189 | A |   | 9/1982  | Gray      |           |
| 4,419,899 | A | * | 12/1983 | Wada      | 73/861.12 |
| 4,722,231 | A |   | 2/1988  | Tanaka    |           |
| 4,912,838 | A | * | 4/1990  | Goto et al. | 29/602.1 |
| 5,847,287 | A |   | 12/1998 | Davis     |           |
| 5,866,823 | A | * | 2/1999  | Scarpa    | 73/861.16 |
| 2005/0000300 | A1 | * | 1/2005 | Zingg   | 73/861.15 |
| 2005/0210997 | A1 | * | 9/2005 | Lincoln et al. | 73/861.08 |

FOREIGN PATENT DOCUMENTS

| DE | 17 99 957 C | 11/1959 |
| DE | 1 423 220   | 10/1968 |
| DE | 3 630 885 A1 | 3/1988 |
| GB | 699 841     | 11/1953 |
| GB | 2 097 935 A | 11/1982 |
| RU | 2 248 528 C2 | 11/2004 |

* cited by examiner

Primary Examiner — Harshad Patel
(74) Attorney, Agent, or Firm — Bacon & Thomas, PLLC

(57) ABSTRACT

A measuring transducer of a flow measuring device for measuring the flow of a medium through an existing pipeline system, wherein, in a cost-favorable manner, an equalization of potential between medium and measuring transducer is effected. The measuring transducer includes a measuring transducer housing, a measuring tube integrated in the measuring transducer, two process connections of an insulating material, via which the measuring tube is connectable to the pipeline system, and, placed in one of the process connections, at least one electrode, which is exposed in an inner space of the process connection, through which medium flows during operation. The electrode is connected with the measuring transducer housing via an electrically conductive connection.

6 Claims, 3 Drawing Sheets

MEASURING TRANSDUCER OF A FLOW MEASURING DEVICE APPLIED IN INDUSTRIAL MEASUREMENTS TECHNOLOGY

TECHNICAL FIELD

The invention relates to a measuring transducer of a flow measuring device.

BACKGROUND DISCUSSION

Flow measuring devices are applied in industrial measurements technology for measuring volume flow, e.g. volume flow rate.

A measuring method current today rests on the magneto-hydrodynamic principle and is applied in conjunction with magneto-inductive flow measuring transducers. In such case, a medium, at least slightly electrically conductive, and whose volume flow is to be measured, is allowed to flow through a measuring tube, through which a magnetic field passes essentially perpendicularly to the measuring tube axis. Charge carriers moved perpendicularly to the magnetic field induce a voltage perpendicular to the direction of the flow of the medium. Such voltage can be tapped via appropriately arranged, measuring electrodes. The measuring electrodes are coupled for such purpose either capacitively or galvanically with the medium. The induced voltage is proportional to a flow velocity averaged over a cross section of the measuring tube and, thus, proportional also to volume flow.

Conventional flow measuring devices, especially magneto-inductive flow measuring devices, employ a measuring transducer, which includes a measuring tube inserted into an existing pipeline system. During measurement, medium flows through the measuring tube. To bring this about, process connections are provided on the measuring transducer, on both ends of the measuring tube. The process connections are in direct contact with the medium and are mounted directly on the measuring transducer.

Due to the high mechanical stability required for such measuring tubes, they are preferably composed of an external, especially metal, support tube of predeterminable strength and diameter. Internally, the support tube is covered with an electrically non-conductive, insulating material of predeterminable thickness, the so-called liner. There are, for example, magneto-inductive, flow measuring transducers, which involve a measuring tube having an inlet-side, first end and an outlet-side, second end. Such a measuring tube is, in turn, composed of a, most-often, non-ferromagnetic, support tube, as an outer jacket of the measuring tube, and a tubular liner of an insulating material, accommodated in a lumen of the support tube, for guiding a flowing medium isolated from the support tube. The liner serves for the chemical isolation of the support tube from the medium. In the case of support tubes of high electrical conductivity, especially in the case of metal support tubes, the liner serves, additionally, as electrical insulation between the support tube and the medium, in order to prevent a short-circuiting of the electrical field via the support tube. By an appropriate design of the support tube, there is thus obtained, a fitting of the strength of the measuring tube to the mechanical loads present in the given case of application; while, by means of the liner, a matching of the measuring tube to the demands, chemical, and, especially, hygienic, relevant for the given case of application can be realized. Applied often for manufacturing the liner are the injection-molding- or transfer-molding-processes. It is, however, also usual to insert a completely prefabricated liner, e.g. one of a thermoplastic or thermosetting, synthetic material, into the support tube.

Flawless measurement is only assured, when the medium and the measuring transducer lie at the same electrical potential. For this, preferably, both the medium and also the housing of the measuring transducer are provided with a ground connection. To the extent that the process connections are made of electrically conductive material, as a rule metal, the equalization of potential is accomplished directly via the process connections, which, in measurement operation, are in contact both with the medium and also with the measuring transducer. Then, there is no need for further potential-equalizing measures. The medium is immediately grounded via the grounding of the measuring transducer, for instance its housing.

There are, however, a large number of applications, in which process connections preferably of insulating material, especially plastic, are used. In this case, special measures must be introduced, in order to assure an equalizing of potential between medium and measuring transducer. The assignee of the invention described and claimed herein, offers today, for this purpose, for example in conjunction with its magneto-inductive flow measuring device, Promag H, a grounding ring, which is installed between the measuring transducer and the process connection and lies, in measurement operation, in contact both with the medium and also with the measuring transducer. The grounding ring effects the necessary equalizing of potential. FIG. 1 shows an example of this. Illustrated are a process connection 1 and a measuring transducer 3. Between process connection 1 and measuring transducer 3 is arranged a grounding ring 5. The grounding ring 5 is made of an electrically conductive material and is in direct contact with the medium during measurement operation. The medium flows through the grounding ring 5. Simultaneously, the grounding ring is, in its assembled state, in direct contact with the housing of the measuring transducer 3. Between the grounding ring 5 and the process connection 1 and between grounding ring 5 and the measuring transducer 3, there is, in each case, a seal 7, 9, in this instance, in each case, an O-ring.

The material of the grounding ring 5 is selected as a function of the material of the measuring electrodes of the magneto-inductive measuring transducer, in order to avoid electrochemical corrosion of the measuring electrodes. Moreover, of course, a material must be selected, which assures sufficient chemical and/or mechanical durability of the grounding ring 5 with respect to the medium. Depending on application, it can be necessary to apply relatively expensive, special materials.

The size of the grounding ring 5 depends on the nominal diameter of the particular process connection. Correspondingly, the amount of material needed for the grounding ring 5 depends on the nominal diameter. Depending on the size of the grounding ring 5 and the choice of material, this form of potential-equalization can be associated with considerable costs.

SUMMARY OF THE INVENTION

It is an object of the invention to provide a flow transducer characterized by an effecting of potential equalization between medium and measuring transducer in a cost-favorable manner.

To this end, the invention resides in a measuring transducer of a flow measuring device for measuring flow of a medium through an existing pipeline system, wherein the measuring transducer includes:

A measuring transducer housing;

a measuring tube integrated in the measuring transducer;

two insulating, process connections, via which the measuring tube is connectable to the pipeline system; and at least one electrode placed in one of the process connections;

wherein the electrode is exposed in a process connection inner space, through which medium flows during operation, and is connected with the measuring transducer housing via an electrically conducting connection.

In an embodiment, the electrode is a peg electrode, which extends through an outer wall of a tubular section of the process connection into the inner space, through which medium flows during operation.

In a further embodiment, the electrode is arranged in a traversing bore in an outer wall of the process connection.

In an embodiment, each process connection containing at least one electrode has a terminal flange, which serves for mounting the process connection to a counterflange of the measuring transducer surrounding a mouth of the measuring tube.

In a further development of the last-mentioned embodiment, the counterflange is electrically conductive and part of the measuring transducer housing or electrically conductively connected therewith. The flange is mountable to the counterflange by means of electrically conductive, mechanical connecting means, and the electrically conductive connection between the electrode and the measuring transducer housing includes a connecting piece, via which the electrode is connected electrically conductively with the mechanical connecting means, when the flange is mounted to the counterflange.

In a further development of this further development, the connecting piece is a formed metal part, which has a first section, which externally contacts a region of the process connection, in which the electrode is placed, and which has a second section, which contacts a surface of the flange facing away from the measuring transducer. The electrode extends through the first section and has a head protruding out of the process connection and contacting the connecting piece. The electrically conductive, mechanical connecting means extend through the second section and contact such.

In another further development, the electrode has an electrode tip, which is exposed in the inner space of the process connection, and an electrode head, which protrudes out of the process connection and is connected with the electrode tip.

Further, the invention resides in a process connection of an insulating material for a measuring transducer of a flow measuring device for measuring a flow of a medium through an existing pipeline system, having a measuring transducer housing and a measuring tube integrated in the measuring transducer, wherein the process connection serves for connecting the measuring tube to the pipeline system, wherein placed in the process connection is at least one electrode, which is exposed in an inner space of the process connection, through which medium flows during operation, and which is connectable with the measuring transducer housing via an electrically conductive connection.

An advantage of the invention is that the electrodes can be made very small, and, accordingly, cost favorably, in comparison to conventional grounding rings. In this way, it is possible to apply also very high value materials in a cost-favorable manner.

A further advantage is that, by application of electrodes in the process connection, it is possible to make use of anyway present, electrically conductive, mechanical connecting means between the process connection and the measuring transducer for producing potential equalization between the measuring transducer housing and the medium. In this way, it is possible to ground the medium via a grounding of the measuring transducer housing present, as a rule, anyway.

BRIEF DESCRIPTION OF THE DRAWINGS

The invention and further advantages will now be explained in greater detail on the basis of the figures of the drawing, in which an example of an embodiment is presented; equal parts are provided in the figures with equal reference characters. The figures show as follows.

DETAILED DESCRIPTION

Figure 1:
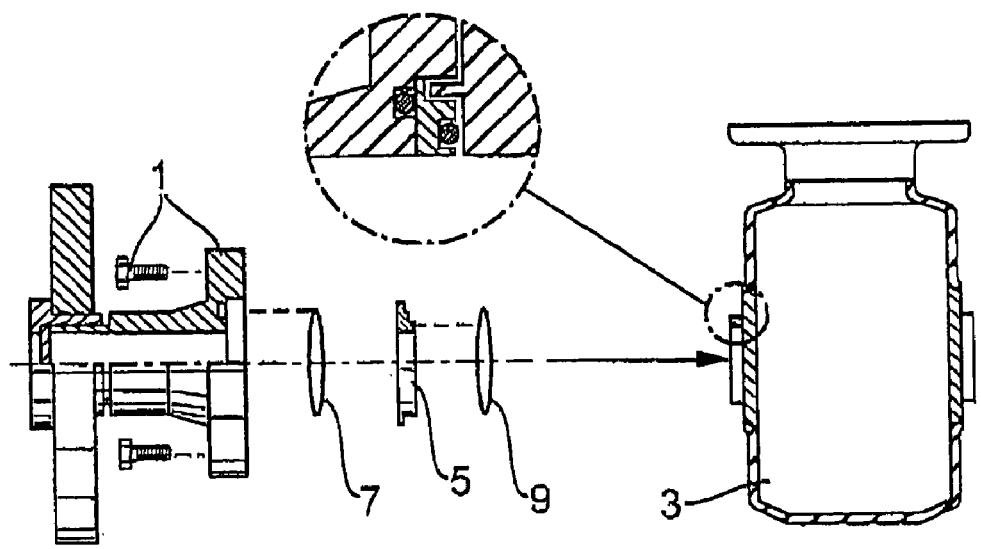
FIG. 1 a known magneto-inductive flow measuring transducer having a grounding ring for effecting potential equalization between medium and measuring transducer.
Figure 2:
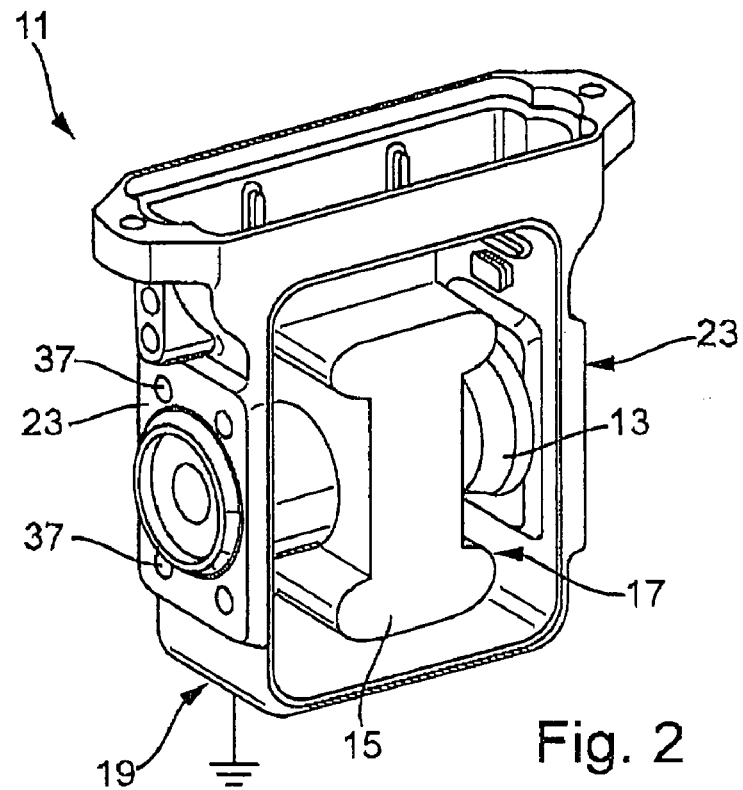
FIG. 2 a view of a magneto-inductive measuring transducer.

FIG. 2 shows a perspective, side view of a measuring transducer 11 of a flow measuring device serving for measuring flow of a medium through an existing pipeline system. The illustrated example of an embodiment involves a measuring transducer of a magneto-inductive, flow measuring device. The invention is, however, not limited to magneto-inductive, measuring transducers, but is, instead, also applicable for the grounding of media in connection with measuring transducers applying other principles of flow measurement.

Measuring transducer 11 of the magneto-inductive flow measuring device shown here includes a measuring tube 13 of predeterminable form and size integrated therein for conveying the medium to be measured, a magnetic field system 15 arranged at the measuring tube 13 for producing and guiding a magnetic field required for the measuring and passing, at least sectionally, through the medium conveyed in the measuring tube 13, as well as a measuring electrode arrangement 17 likewise arranged on the measuring tube 13 for measuring a voltage induced in the medium. For tapping voltages induced in the flowing medium, the measuring electrode arrangement 17 includes, for example, two galvanic or capacitive, measuring electrodes.

The magnetic field system is advantageously so developed that the magnetic field produced therewith passes through the medium located within the measuring tube 13 at least sectionally perpendicularly to its flow direction.

Figure 3:
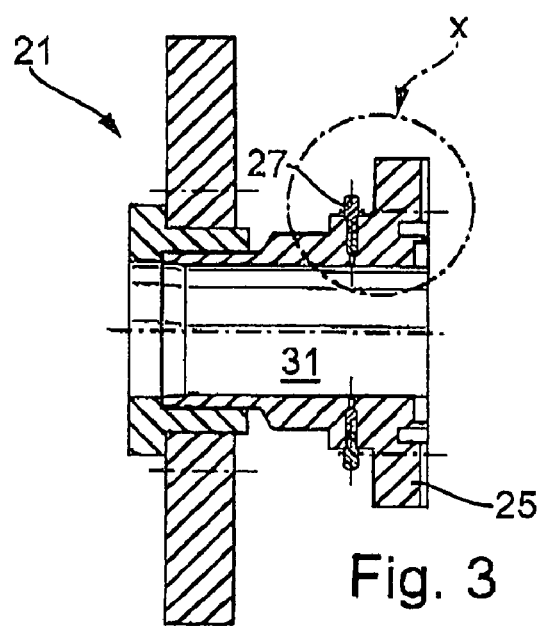
FIG. 3 a section of a process connection.
Figure 4:
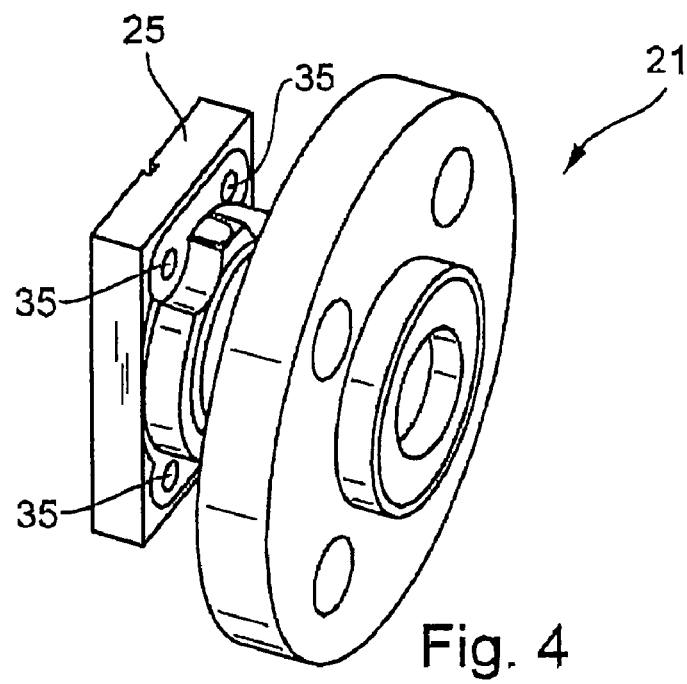
FIG. 4 a view of the process connection of FIG. 3.

Additionally, the measuring transducer 11 includes a measuring transducer housing 19. In the illustrated example of an embodiment, the measuring transducer housing 19 comprises an essentially rigid support frame for holding an electronics housing (not shown) electrically and mechanically connected with the measuring transducer 11, with measuring tube 13 and support frame being connected mechanically together both on the inlet side and on the outlet side. For pressure-sealed insertion into the existing pipeline system, the measuring transducer 11 includes, in each case, on the inlet side and on the outlet side, means for mechanical securement of process connections 21. FIG. 3 shows a section and FIG. 4 a view of a process connection 21. The process connections 21 are composed of an insulating material, especially a plastic, such as e.g. polyvinyl chloride (PVC) or polyvinylidene fluoride (PVDF). In the illustrated example of an embodiment, the means for mechanical securement of the process connections includes, in each case, a counterflange 23 surrounding an associated mouth of the measuring tube for assembly with a corresponding flange 25 of the associated process connection 21. The two counterflanges 23 are, in the example of an embodiment shown here, integrated, in each case, into the support frame, especially molded into the frame. In advantageous manner, support frame and counterflanges 23 can, in such case, be embodied as one piece.

Measuring tube 13 includes, for example, a metal support tube, whose inner surface is provided with a liner of insulating material isolating the medium from the support tube as it flows through during measurement operation. The support tube is made of a magnetically conductive material, especially a non-ferromagnetic material, such as e.g. stainless steel or another stainless material. The support tube surrounds the liner coaxially and serves, thus, as an external, form-giving, as well as form-stabilizing, jacket. The liner is, in such case, so embodied, that the measuring tube 13 is completely protected internally from the medium as it flows through and, thus, essentially, alone the liner is wetted by the medium flowing through the measuring tube 13. The connection of the measuring transducer 11 to the existing pipeline system is accomplished via two process connections 21.

Figure 5:
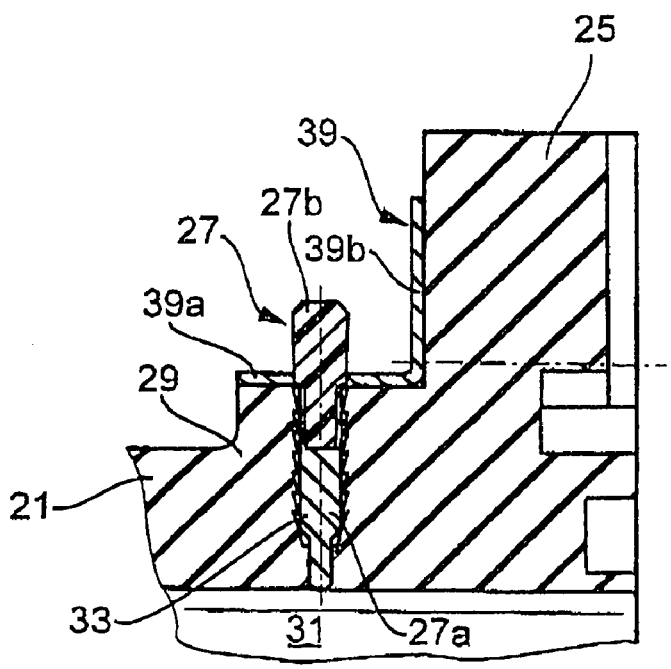
FIG. 5 an enlarged section of the process connection shown in FIG. 3 and containing the electrode.

According to the invention, at least one electrode 27 is placed in at least one of the two process connections 21. FIG. 5 shows an enlargement of a section X of the process connection 21 of FIG. 3 containing the electrode 27. Electrode 27 is exposed in an inner space 31 of the process connection 21 through which medium flows during operation. Via electrode 27, there is an electrically conductive connection to the medium. This connection serves for the above-described, potential equalization between the measuring transducer 11 and the medium. Electrode 27 is, in contrast to the aforementioned grounding rings 5, not bound, as regards its dimensions, to the dimensions of the pipeline system, or measuring tube 13. Electrode 27 can be very small. Due to the small requirement for material for the electrode 27, also very high-value materials, such as e.g. platinum, tantalum or Hastelloy C, can be applied as material for the electrodes 27, without thereby causing costs for materials to rise significantly.

A further reduction of materials costs can be achieved by making only the part of the electrode 27 coming in contact with the medium of the high-value material. An example in this regard is shown in FIG. 5. The electrode 27 illustrated there is composed of two parts, namely an electrode tip 27a, which is exposed in the inner space 31 of the process connection 21, and an electrode head 27b, which extends out of the process connection 21 and is connected with the electrode tip 27a. In such case, it suffices that the electrode tip 27a is made of an application-specific, possibly very high-value material. The electrode head 27b can be made of a cost-favorable, electrically conductive material, e.g. a simple steel, or stainless steel. The electrode tip 27a is placed liquid-sealed into the bore 33. For this, for example, the teachings of EP 0 892 252 A1 can be applied. There, a measuring electrode is arranged in a measuring transducer. The liquid-sealed installation can be achieved, for example, by providing the electrode tip 27a with sequentially arranged, frusto-conical sections, in which the material, in which the bore 33 is placed, binds.

Electrode tip 27a is, for example, screwed via a screw connection onto a threaded pin in the bore 33 formed on the electrode head 27b.

In order to prevent electrochemical corrosion of the electrodes caused by electrochemical interaction between electrode 27 and the measuring electrodes of the measuring electrode arrangement 17, the electrodes 27 and the measuring electrodes of the measuring electrode arrangement 17 are preferably made of the same material, e.g. a stainless steel, platinum, tantalum or Hastelloy C. To the extent that this is not possible, the measuring electrodes of the measuring electrode arrangement 17 should be made of a more noble material than the electrodes 27 used for grounding the medium. In this way, electrochemical corrosion attacks first the electrodes 27 and not the measuring electrodes of the measuring electrode arrangement 17. The idea behind this is that the electrodes 27 are much easier to service and, as required, replace, than are the measuring electrodes. Moreover, naturally, a material must be selected that assures sufficient chemical and/or mechanical durability of the electrodes 27 with respect to the medium. Depending on application, it can be necessary to apply relatively expensive, special materials.

Electrode 27 is, in the illustrated example of an embodiment, a peg electrode, which extends through an outer wall 29 of a tubular section of the process connection, through which medium flows during operation, into inner space 31 of the process connection. Electrode 27 is located in a traversing bore 33 of the process connection 21 extending through the outer wall 29.

Electrode 27 is connected with the measuring transducer 11, especially its transducer housing 19, via an electrically conducting connection. In this way, the desired potential equalization is effected. The medium is grounded via the grounding of the measuring transducer housing 19. The grounding of the measuring transducer housing 19, shown here only schematically, is, as a rule, prescribed by law and is done, typically, via the electrical connection (not shown) of the measuring transducer 11.

The electrically conducting connection can be brought about in numerous ways. Preferably used for this is the mechanical connection required anyway between the process connection 21 and the measuring transducer 11. Each process connection 21 containing at least one electrode 27 has the terminally located, aforementioned flange 25, which serves for assembly with the counterflange 23 of the measuring transducer surrounding the mouth of the measuring tube 13. Preferably, counterflange 23 is electrically conductive and part of the measuring transducer housing 19 or electrically conductively connected therewith. As a rule, the counterflange 23 is made anyway of a metal, e.g. steel or stainless steel, and is, thus, electrically conductive.

Flange 25 can be mounted to the counterflange by means of electrically conductive, mechanical connecting means. In the illustrated example of an embodiment, flange 25 has traversing bores 35, through which metal bolts, or machine screws, (not shown) are screwed into blind, threaded bores 37 in the counterflange 23.

Additionally, the electrically conductive connection between electrode 27 and the measuring transducer 11 includes a connecting piece 39, via which electrode 27 is connected electrically conductively with the mechanical connecting means, here the bolts, or machine screws, when flange 25 is mounted on the counterflange 23.

In the illustrated example of an embodiment, the connecting piece 39 is a formed metal part, e.g. one made from stainless steel sheet. Connecting piece 39 includes a first section 39a, which lies externally against a region of the process connection 21, where electrode 27 is placed, and a second section 39b, which lies against the surface of the flange 25 facing away from the measuring transducer 11. Electrode 27 extends through the first section 39a and has, protruding out of the process connection 21, a head 27b, which contacts the connecting piece 39. The electrically conductive, mechanical connecting means extend through the second section 39b and contact it.

LIST OF REFERENCE CHARACTERS

1 process connection
3 measuring transducer
5 grounding ring
7 seal
9 seal
11 measuring transducer
13 measuring tube
15 magnetic field system
17 measuring electrode arrangement
19 measuring transducer housing
21 process connection
23 counterflange
25 flange
27 electrode
27a electrode tip
27b electrode head
29 outer wall
31 inner space
33 bore
35 bores
37 blind, threaded bores
39 connecting piece
39a section
39b section

The invention claimed is:

1. A measuring transducer of a flow measuring device for measuring flow of a medium through an existing pipeline system, comprising: a measuring transducer housing; a measuring tube integrated in said measuring transducer; two process connections of insulating material, via which said measuring tube is connectable to the pipeline system; at least one electrode placed in one of said two process connections, wherein: said at least one electrode is exposed to an inner space of said process connection and is connected with said measuring transducer housing via an electrically conductive connection; and, wherein: said at least one electrode has an electrode tip, which is exposed in said inner space of said one of said two process connections, and an electrode head, which protrudes out of said one of said process connections and which is connected between the electrode tip and with the electrically conductive connection.

2. The measuring transducer as claimed in claim 1, wherein:
said at least one electrode is a peg electrode, which extends through an outer wall of said tubular section of said process connection, through which medium flows during operation, and extends into said inner space.

3. The measuring transducer as claimed in claim 1, wherein:
said at least one electrode is arranged in a traversing bore in an outer wall of said process connection.

4. The measuring transducer as claimed in claim 1, wherein:
each process connection containing at least one electrode has a terminal flange, which serves for mounting the process connection to a counterflange of the measuring transducer surrounding a mouth of said measuring tube.

5. The measuring transducer as claimed in claim 4, wherein:
said counterflange is electrically conductive and is part of said measuring transducer housing or electrically conductively connected therewith;
said terminal flange is mountable to said counterflange by means of electrically conductive, mechanical, connecting means; and
the electrically conductive connection between said at least one electrode and said measuring transducer housing includes a connecting piece, via which said at least one electrode is electrically conductively connected with said mechanical, connecting means, when said terminal flange is mounted to said counterflange.

6. The measuring transducer as claimed in claim 5, wherein:
said connecting piece is a formed metal part, which includes a first section externally contacting a region of said process connection, in which said at least one electrode is placed, and
which has a second section contacting a surface of said terminal flange facing away from the measuring transducer;
said at least one electrode extends through said first section and has, protruding out of said process connection, a head, which contacts said connecting piece; and
said electrically conductive, mechanical, connecting means extend through said second section and contact such.

\* \* \* \* \*